United States Patent [19]
Zacharias, Jr.

[11] Patent Number: 4,523,478
[45] Date of Patent: Jun. 18, 1985

[54] SONIC FLOW METER HAVING IMPROVED FLOW STRAIGHTENERS

[75] Inventor: Ellis M. Zacharias, Jr., Tulsa, Okla.

[73] Assignee: Nusonics, Inc., Tulsa, Okla.

[21] Appl. No.: 524,375

[22] Filed: Aug. 18, 1983

[51] Int. Cl.$^3$ ............................................. G01F 1/66
[52] U.S. Cl. ................................................ 73/861.28
[58] Field of Search ............ 73/861.27, 861.28, 861.29, 73/861.31

[56] References Cited

U.S. PATENT DOCUMENTS

| | | | |
|---|---|---|---|
| 2,991,650 | 7/1961 | Katzenstein et al. | 73/861.28 |
| 4,014,210 | 3/1977 | Husse et al. | 73/861.28 |
| 4,365,518 | 12/1982 | Zacharias, Jr. | 73/861.28 |
| 4,375,204 | 3/1983 | Yamamoto | 73/118 A |
| 4,475,406 | 10/1984 | Ansaldi et al. | 73/861.29 |

FOREIGN PATENT DOCUMENTS 57-194313  11/1982  Japan ............................. 73/861.18

Primary Examiner—Tim Miles
Attorney, Agent, or Firm—Head, Johnson & Stevenson

[57] ABSTRACT

A sonic flow meter in the form of a conduit providing a linear fluid flow path and having first and second openings on opposite sides of the conduit displaced in an upstream-downstream relationship providing a sonic path through the interior of the conduit, with sonic transducers elements positioned to transmit and receive energy through the sonic path, and having an upstream and downstream flow straightener for separating the fluid stream into a plurality of reduced-cross-sectional area streams, ends of the flow straightener being in planes paralleling, and adjacent the sonic path.

13 Claims, 5 Drawing Figures

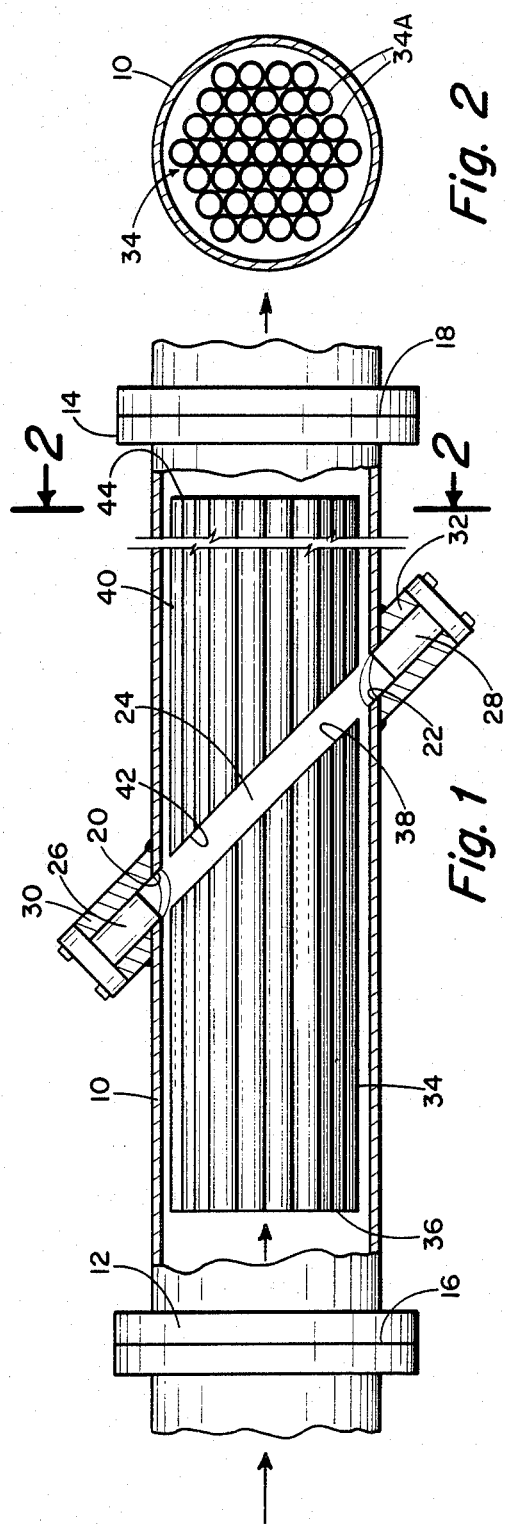
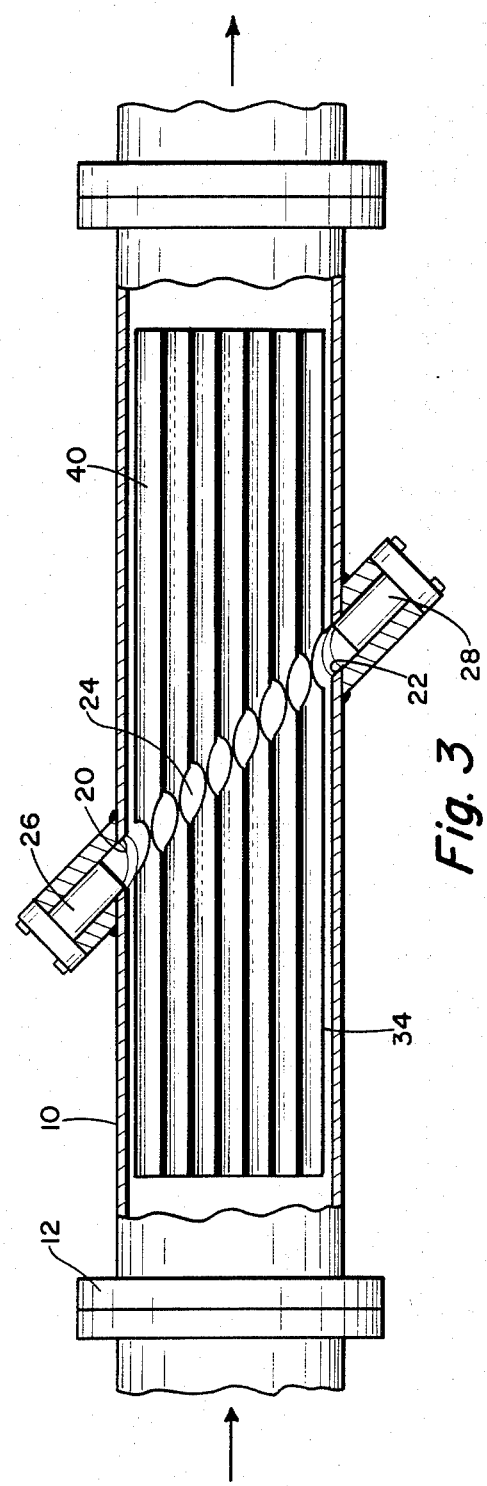

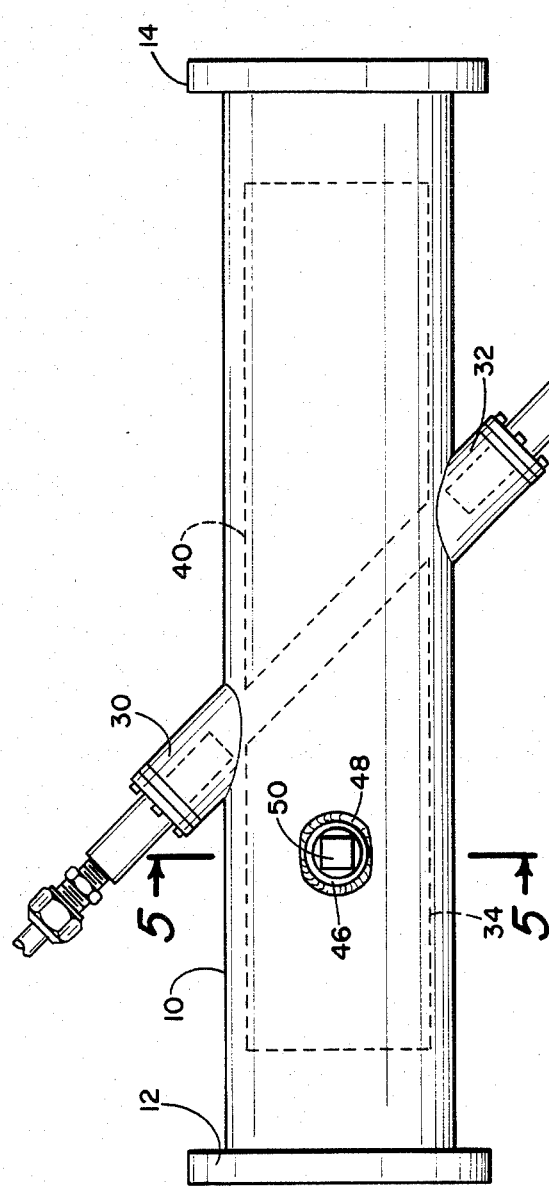
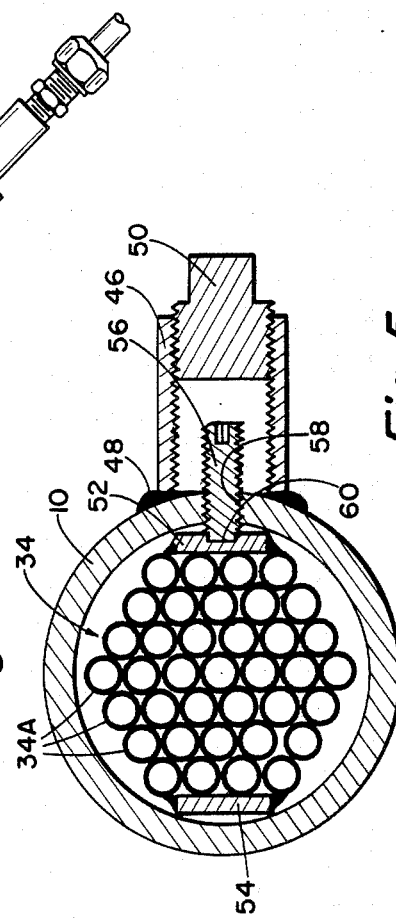

SONIC FLOW METER HAVING IMPROVED FLOW STRAIGHTENERS

SUMMARY OF THE INVENTION

A means frequently employed for measuring the rate of fluid flow in a stream is by the use of a sonic flow meter in which sound energy is transmitted in the flow stream and the speed of sound transmission measured. The meter is arranged so that the rate of fluid flow sound speed affects the measurement to thereby provide an indication of the fluid stream flow rate.

One problem encountered in sonic flow meters is that of inaccuracies in the detected speed of sound transmission caused by turbulence in the fluid stream. For this purpose it has been found desireable to design flow meters so that in the area of sound transmission the turbulence is a minimum. One means of reducing turbulence is to provide flow straighteners. U.S. Pat. No. 4,365,518 entitled "Flow Straighteners in Axial Flow Meters" is an example of the use of flow straighteners to improve the performance of flow meters. The type of flow meter to which the flow straighteners of U.S. Pat. No. 4,365,518 pertain is called an "axial flow meter" in that the transducers which transmit and receive the sound energy are placed at opposite ends of a conduit through which the fluid flows. A different type of sonic flow meter frequently employed utilizes transducers which are placed on opposite sides of a flow conduit in an upstream-downstream arrangement.

The present invention is directed towards a type of flow meter in which the sonic flow path is transverse the axis of the fluid flow path.

The flow meter includes a conduit having an inlet end and an outlet end providing a linear fluid flow path therebetween.

First and second openings are formed on opposite sides of the conduit. The openings are displaced in an upstream-downstream relationship providing a sonic path through the interior of the conduit, the sonic path being at a preselected angle to the conduit linear fluid flow path.

Spaced apart transducer elements are positioned to transmit and receive sound energy traveling through fluid as it traverses the conduit.

An upstream flow straightener is positioned within the conduit fluid flow path for separating the fluid stream into a plurality of reduced-cross-sectional area streams, each of which provides a separate linear fluid flow path. The flow straightener has a rearward end which is contiguous to and in substantial conformity with said sonic path. A downstream flow straightener is also positioned within the conduit fluid flow path for separating the fluid stream into a plurality of reduced cross-sectional area streams. The downstream flow straightener forward edge is contiguous to and in substantial conformity with the sonic path so that the sonic path extends between the closely spaced upstream and downstream flow straighteners.

The term "turbulence" as used in this disclosure means irregular fluctuations in the fluid flow stream, such as swirls and eddies, causing non-symmetrical flow profiles which give rise to shifts in meter factors.

DESCRIPTION OF THE DRAWINGS

FIG. 1 is a cross-sectional view of one embodiment of this invention showing a conduit through which fluid flows and in which the rate of fluid flow is measured by employment of sonic energy, the conduit being shown in cross-section and showing the employment of a bundle of upstream and downstream fluid flow straighteners.

FIG. 2 is a cross-sectional view taken along the line 2—2 of FIG. 1.

FIG. 3 is a view as in FIG. 1 that is, a cross-sectional view of a flow meter. This Figure shows a different arrangement for providing the sonic flow path in a bundle of a bundle of small diameter linear tubes.

FIG. 4 is an external view of a sonic flow meter such as illustrated in FIGS. 1, 2 and 3.

FIG. 5 is a cross-sectional view taken along the line 5—5 of FIG. 4 showing one means of mounting flow straighteners in a conduit.

DETAILED DESCRIPTION OF THE PREFERRED EMBODIMENT

Referring to the drawing and first to FIG. 1, a cross-sectional view showing one embodiment of the invention is shown. The sonic flow meter includes a conduit 10 through which fluid flows, the conduit being linear, so that fluid flows in a straight path through the conduit. Conduit 10 is usually connected to piping apparatus such as by the use of end flanges 12 and 14. The conduit 10 has an inlet end 16 formed at flange 12 and an outlet end 18 formed at flange 14.

Formed in the sidewall of conduit 10 is a first opening 20 and a second opening 22. The openings 20 and 22 are in a plane of the conduit longitudinal axis and on opposite sides of the conduit. The openings 20 and 22 are displaced in an upstream-downstream relationship providing a sonic flow path 24 through the interior of the conduit. The sonic flow path is at a preselected angle to the conduit linear fluid flow path.

A first transducer element 26 is positioned to transmit and/or receive sonic energy through opening 20, and in like manner, a second transducer element 28 is positioned to transmit and/or receive sonic energy through opening 22. A housing 30 is secured around opening 20 in a leak proof manner to close the opening and to house the first transducer 26. In like manner, a second housing 32 closes opening 22 and provides protection and support for the second transducer 28.

The sonic flow meter described up to this point is a typical, well-known type of flow measuring equipment. By transmitting sonic energy through the fluid flowing through the conduit the speed of movement of the fluid can be accurately measured. However, any turbulence which exists in the fluid flow stream can introduce substantial error. To minimize the existence of turbulence in the fluid as it flows through the sonic pathway 24, an upstream flow straightener generally indicated by the numeral 34 is utilized. The flow straightener is positioned within the conduit upstream of the sonic flow path 24 and has a forward end 36 and a rearward end 38. The flow straightener rearward end 38 is contiguous to and in substantial conformity with the sonic flow path 24.

One means of forming the flow straightener 34 is illustrated in the cross-sectional view of FIG. 2 in which the flow straightener is formed of a plurality of small diameter tubes 34A. While the tubes are shown to be circular in cross-section it can be seen that they could be square, hexagonal, or so forth. In addition to being formed of tubes the flow straightener may be formed of a grid of intersecting horizontal and parallel plates. Any arrangement which provides a plurality of reduced cross-sectional dimensioned lineal flow paths upstream of the sonic flow path 24 and wherein the rearward end 38 of such flow straightener is in substantial geometrical conformity with and adjacent to the flow path 24 would be within the purvue of this disclosure.

Referring again to FIG. 1, positioned downstream of the sonic flow path 24 is a downstream flow straightener 40 having a forward end 42 and a rearward end 44. The forward end 42 is preferrably configured geometrically to approximate the sonic flow path 24 and to be adjacent to it. Thus the sonic flow path 24 is defined by the space between the upstream flow straightener rearward end 38 and the downstream flow straightener forward end 42. The tubes or other elements of which the upstream and downstream flow straighteners 34 and 40 respectively are formed are preferrably arranged in coaxial relationship. In this manner the flow through the sonic path 24 is substantially linear and free of turbulence.

FIG. 3 shows an alternate means of accomplishing the result of the invention. In FIG. 3 the upstream flow straightener 34 and the downstream flow straightener 40 are formed of the same bundle of individual tubes or other elements for providing a plurality of linear reduced cross-sectional area flow streams through conduit 10. The flow path 24 is formed by drilling a hole through the bundle of tubes, the hole being drilled in the axis of openings 20 and 22. One means of accomplishing this is to assemble the bundle of tubes within conduit 10 and then passing a drill through opening 20 to emerge through opening 22. The drill forms an opening through the tubes which thereby defines the flow path 24. In another arrangement the bundle of tubes may be assembled and a hole drilled prior to insertion of the tubes within conduit 10, in which case the hole may be drilled to a larger diameter than that of openings 20 or 22.

FIG. 4 is an external view of a sonic flow meter as shown in FIGS. 1 and 3 with more details being shown of the arrangement for connecting tubing for containing conductors extending to the transducer elements. The upstream and downstream flow straighteners 34 and 40 respectively are shown in dotted outline.

Secured to the exterior of conduit 10 in FIG. 4 is a short length tubular nipple 46 which may be secured to the conduit such as by welding 48. The outer end of the nipple 46 is closed by a plug 50.

FIG. 5, a cross-sectional view of the arrangement in FIG. 4, shows one means of supporting the flow straighteners within conduit 10. As previously described, and illustrative of one embodiment of the invention, the flow straightener 34 may be formed of a plurality of small diameter tubes 34A. These tubes may be bonded to each other in a bundle so that the exterior of the bundle closely fits within the interior of conduit 10. To hold the bundle in position, elongated bars 52 and 54 are secured to the bundle along opposite sides thereof. A set screw 56 is received in a threaded opening 58 formed in the wall of conduit 10. Bar 52 has a recess 60 which receives the inner end of set screw 56.

To assemble the flow meter, the upstream flow straightener bundle 34 is positioned within conduit 10 so that the recess 60 in bar 52 is in alignment with the conduit threaded opening 58. Set screw 56 may then be threaded to engage bar 52 through threaded opening 58. As set screw 56 is tightened the bundle of tubes 34A is forced towards the opposite interior wall of conduit 10. Bar 54 engages the interior wall. The bundle of tubes 34A are thus held in compression between bars 52 and 54. Plug 50 is inserted in place in the nipple sealably closing the opening 58.

While not illustrated, the downstream flow straightener 40 may be secured in a like manner.

The invention provides an improved sonic flow meter in which flow straighteners are placed adjacent the sonic flow path to provide a linear flow of fluid through the sonic path. In this manner, improved accuracy and repeatability of measurements provided by means of sonic energy is achieved.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A sonic flowmeter comprising:
   a conduit having an inlet end and an outlet end, and providing a linear fluid flow path therebetween;
   a first and a second opening in said conduit, the openings being in a plane of the conduit longitudinal axis and on opposite sides of the conduit, the openings being displaced in an upstream-downstream relationship providing a sonic path through the interior of the conduit, the sonic path being at a preselected angle to the conduit linear fluid flow path;
   first and second spaced apart transducer elements positioned to transmit and receive sound energy traveling through fluid as it traverses said conduit;
   an upstream flow straightener within said conduit fluid flow path for separating the fluid stream into a plurality of reduced-crossectional area streams, each providing a separate linear fluid flow path, the flow straightener having a forward end and rearward end, the rearward end being contiguous to and in substantial conformity with said sonic path.

2. A sonic flowmeter according to claim 1 wherein said upstream flow straightener rearward end is in a plane having an angle to said conduit longitudinal axis substantially conforming to said sonic flowpath preselected angle.

3. A sonic flowmeter according to claim 1 including:
   a downstream flow straightener within said conduit fluid flow path for separating the fluid stream into a plurality of reduced cross-sectional area streams, each providing a separate linear fluid flow path downstream of said sonic path.

4. A sonic flowmeter according to claim 3 wherein said downstream flow straightener forward end is contiguous to and in substantial conformity with said sonic flow path whereby said sonic flow path extends between said upstream flow straightener adjacent rearward end and said downstream flow straightener adjacent forward end.

5. A sonic flowmeter according to claim 4 wherein said downstream flow straightener forward end is in a plane having an angle to said conduit longitudinal axis substantially conforming to said sonic flow path preselected angle.

6. A sonic flowmeter according to claim 1 wherein said upstream flow straightener rearward end is in a plane having an angle to said conduit longitudinal axis substantially conforming to said sonic flow path preselected angle, and including:

a downstream flow straightener within said conduit fluid flow path for separating the fluid column into a plurality of reduced cross-sectional area streams, each providing a separate linear flow path downstream of said sonic path, said downstream flow straightener having a forward end in a plane having an angle to said conduit longitudinal axis substantially conforming to said sonic flow path preselected angle, said upstream flow straightener rearward end being spaced from and substantially parallel said downstream flow straightener forward end, said sonic path being therebetween.

7. A sonic meter according to claim 1 wherein said upstream flow straightener is in the form of a plurality of small diameter linear tubes, the axis of each being parallel said conduit longitudinal axis.

8. A sonic flowmeter according to claim 3 wherein said upstream and downstream flow straighteners are in the form of separate bundles, each formed of a plurality of small diameter tubes, the axis of each being parallel said conduit longitudinal axis.

9. A sonic flowmeter according to claim 3 wherein said upstream and downstream flow straighteners are formed of a unitary bundle of small diameter tubes, the axis of each being parallel said conduit longitudinal axis and extending through said sonic path, the sonic path being formed by an opening extending through said bundle.

10. A sonic flowmeter according to claim 9 wherein said opening formed through said bundle has a longitudinal axis substantially conforming to a line drawn through said conduit first and second openings.

11. A sonic flowmeter according to claim 1 wherein said conduit has a small diameter theaded opening therein upstream of said first and second openings, and wherein said upstream flow straightener is in the form of a bundle formed of a plurality of small diameter linear conduits;

a structural member affixed to said bundle having a recess therein;

a bolt extending and threadably through said conduit small diameter opening, and the inner end of the bolt engaging said recess in said structural member so thus as the bolt is tightened said bundle is forced on compression against said conduit opposite interior wall thereby serving to retain said flow straightener bundle in said conduit.

12. A sonic flowmeter according to claim 11 including:

a short length tubular member secured at its inner end to said conduit and encompassing said small diameter opening and said bolt; and means to close the outer end of said tubular member to seal said small diameter opening against leakage.

13. A sonic flowmeter according to claim 11 wherein said bundle of small diameter tubes and said structural member are configured in cross-section to be slidably and snugly received in said conduit.

* * * * *